(12) United States Patent
Ogiwara et al.

(10) Patent No.: US 10,365,484 B2
(45) Date of Patent: Jul. 30, 2019

(54) HEAD-UP DISPLAY DEVICE

(71) Applicant: Konica Minolta, Inc., Tokyo (JP)

(72) Inventors: Kenji Ogiwara, Hachioji (JP); Kenji Hamada, Hachioji (JP); Shinobu Suga, Hachioji (JP); Yosuke Aoki, Machida (JP); Toshiya Takitani, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/739,865

(22) PCT Filed: Jun. 20, 2016

(86) PCT No.: PCT/JP2016/068222
§ 371 (c)(1),
(2) Date: Dec. 26, 2017

(87) PCT Pub. No.: WO2016/208529
PCT Pub. Date: Dec. 29, 2016

(65) Prior Publication Data
US 2018/0188533 A1 Jul. 5, 2018

(30) Foreign Application Priority Data

Jun. 26, 2015 (JP) .................................. 2015-128593
Oct. 26, 2015 (JP) .................................. 2015-209675

(51) Int. Cl.
*G02B 27/01* (2006.01)
*B60K 37/02* (2006.01)
(Continued)

(52) U.S. Cl.
CPC .......... *G02B 27/0101* (2013.01); *B60K 35/00* (2013.01); *B60K 37/02* (2013.01);
(Continued)

(58) Field of Classification Search
CPC ......... G02B 2027/013; G02B 27/0101; G02B 1/14; G02B 5/08; G02B 5/10; G02B 27/01; G02B 27/0172; B60K 35/00; B60K 37/02
See application file for complete search history.

(56) References Cited

FOREIGN PATENT DOCUMENTS

| JP | 2000-039581 A | 2/2000 |
| JP | 2004-184767 A | 7/2004 |

(Continued)

OTHER PUBLICATIONS

Kazumitsu et al.; JP 2004-184767; Jul. 2, 2004; Machine Translation in English (Year: 2004).*

(Continued)

*Primary Examiner* — Ryan D Howard
(74) *Attorney, Agent, or Firm* — Osha Liang LLP

(57) ABSTRACT

A head-up display device includes: an image generator that emits light; and a display member including: a projection surface onto which the light is projected, wherein when the light is emitted to the projection surface, the light is reflected from the projection surface to display a real image passing through the display member and a virtual image; and a plate material including: a pair of optical surfaces, one positioned nearer to an observer side than the other, and either of which can serve as the projection surface; an end surface connecting peripheries of the pair of optical surfaces; and an end main surface formed at a predetermined a distance from the end surface to a reference line passing through a reference point and being orthogonal to a tangent plane at the reference point.

17 Claims, 4 Drawing Sheets

(51) Int. Cl.

| | | |
|---|---|---|
| *B60K 35/00* | (2006.01) | |
| *G02B 1/11* | (2015.01) | |
| *G02B 5/08* | (2006.01) | |
| *G02B 5/10* | (2006.01) | |
| *G02B 1/14* | (2015.01) | |
| *G02B 1/18* | (2015.01) | |

(52) U.S. Cl.
CPC ................. *G02B 1/11* (2013.01); *G02B 1/14* (2015.01); *G02B 5/08* (2013.01); *G02B 5/10* (2013.01); *G02B 27/01* (2013.01); *B60K 2350/1072* (2013.01); *B60K 2350/2052* (2013.01); *B60K 2350/2065* (2013.01); *B60K 2350/2082* (2013.01); *G02B 1/18* (2015.01)

(56) References Cited

FOREIGN PATENT DOCUMENTS

| JP | 2009-292223 A | 12/2009 |
|---|---|---|
| JP | 2013-134480 A | 7/2013 |
| JP | 2014-211533 A | 11/2014 |

OTHER PUBLICATIONS

International Search Report for corresponding International Application No. PCT/JP2016/068222, dated Aug. 20, 2016 (4 pages).
Written Opinion for corresponding International Application No. PCT/JP2016/068222, dated Aug. 30, 2016 (8 pages).

* cited by examiner

HEAD-UP DISPLAY DEVICE

BACKGROUND

Technical Field

One or more embodiments of the invention relate to a head-up display device mainly used for, for example, an automobile, and particularly to a head-up display device which uses a translucent display member (combiner) to allow a driver (observer) to see both of windshield view seen in light passing through a combiner and image or information in light reflected from the combiner, where the image or information are superimposed on the windshield view in the driver's field of view.

Background Art

Head-up display devices are known to directly display information in drivers' fields of view. Such a head-up display device is configured to directly display information, such as a speed indicated on a meter, as a virtual image in front of a driver driving a vehicle. Therefore, the driver can drive the vehicle without changing his/her line of sight and focal point, preventing accidents.

Recent years have seen a rise in interest in automobile safety standard, and further spread of the head-up display devices has been expected to reduce burdens on drivers.

There is a dedicated combiner which is installed in a dashboard of a vehicle, as one type of head-up display device. A head-up display device of such type is highly versatile due to the design of an optical system not limited to a specific type of vehicle, in comparison with a head-up display device performing direct projection on a windshield. Therefore, with increasing types of vehicles to which such type of head-up display device is mounted, this type of head-up display device has been expected to be employed relatively more widely.

Furthermore, such a head-up display device can be used not only for a general automobile but also secondarily for a special work vehicle, aircraft, or the like to support a driver or a pilot by using a similar configuration. Therefore, it can be said that the head-up display device occupies a major position to prompt the spread of a head-up display technology.

Incidentally, when the combiner is mounted to a vehicle or the like, external light, such as sunlight, incident from outside the vehicle is reflected from an upper end surface of the combiner and then, disadvantageously incident to a driver's eye (referred to as primary reflection), or external light is reflected from the upper end surface of the combiner to a windshield and the reflected light is disadvantageously incident on the driver's eye (referred to as window reflection), bothering the driver.

In Patent Literature 1, an upper end surface of a combiner is roughened to diffuse light, and primary reflection is prevented. Furthermore, in Patent Literature 2, as a kind of roughening, a specific fine texture is provided on an upper end surface of the combiner to reduce light reflected to a windshield, thereby preventing window reflection.
Patent Literature 1: JP 2000-39581 A
Patent Literature 2: JP 2014-211533 A

SUMMARY OF INVENTION

As a matter of course, as in the related arts described above, an upper end surface of a combiner which is roughened or provided with a fine texture can reduce primary reflection or window reflection to some extent. However, it was found that when coating, such as hard coat, is applied to a roughened surface or fine uneven texture of the combiner to prevent scratches, secure the hardness of the surface, or protect an antireflection film or a half mirror layer, projections and recesses are buried and leveled while coating and light scattering effect may be lost. Furthermore, even when no coating such as hard coat is applied, a method of reducing reflection is needed, excluding the roughening.

One or more embodiments of the invention provide a head-up display device which reliably suppresses the incidence of reflected light of external light from outside a vehicle, on an observer's eye.

According to one or more embodiments, a head-up display device includes an image generation unit for emitting light to be displayed, and a display member including a projection surface onto which light to be displayed, emitted from the image generation unit, is projected, in which, when light to be displayed is emitted to the projection surface, the light to be displayed is reflected from the projection surface and an image represented by the light to be displayed can be observed as a virtual image, and furthermore, a real image passing through the display member can be observed, wherein the display member includes a plate material having an optical surface positioned on a side far from an observer observing the virtual image and the real image, an optical surface positioned on a side near to the observer, and an end surface connecting the peripheries of the pair of optical surfaces, any of the optical surfaces serving as the projection surface, and, when a tangent plane is positioned at any one point on a line passing through a midpoint of the projection surface and extending in a horizontal direction along the projection surface, in a cross-section of the display member taken along a virtual plane orthogonal to the tangent plane, passing through the any one point, and extending in a vertical direction, an end main surface is formed to have a distance from the end surface to a reference line passing through the any one point and orthogonal to the tangent plane, monotonically decreasing from the optical surface positioned on a side near to the observer to the optical surface positioned on a side far from the observer, and the end main surface occupies at least 70% of the end surface in a thickness direction of the display member.

In one or more embodiments, a head-up display device can be provided which reliably suppresses the incidence of reflected light of external light from outside a vehicle, on an observer's eye.

DETAILED DESCRIPTION

Figure 1:
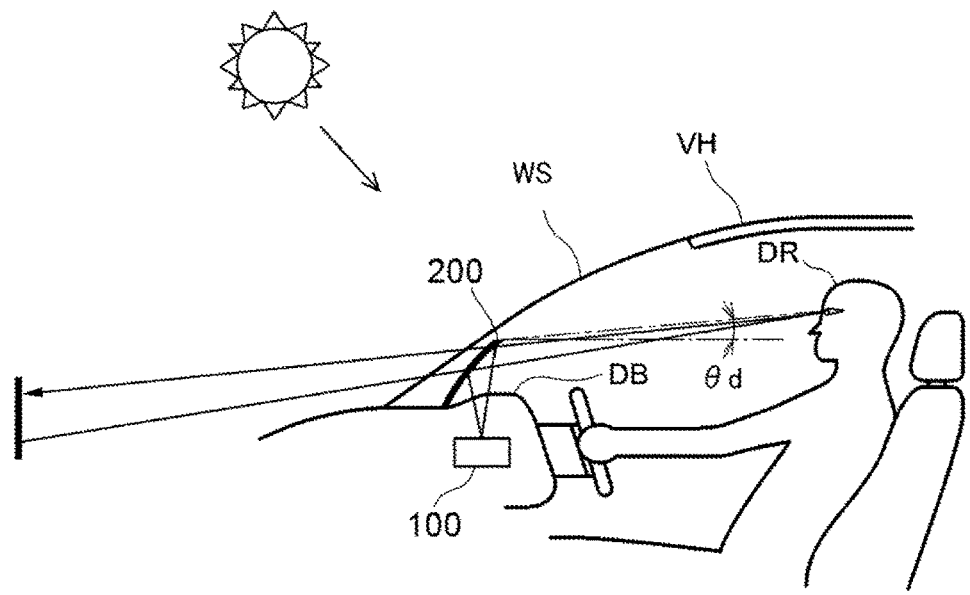
FIG. 1 is a diagram illustrating a state of a vehicle VH in which a head-up display device according to one or more embodiments is mounted.

Hereinafter, embodiments will be described in detail with reference to the drawings. FIG. 1 is a diagram illustrating a state of a vehicle VH in which a head-up display device according to one or more embodiments is mounted. The vehicle VH includes a dashboard DB in which an image generation unit 100 is disposed to project light to be displayed onto a combiner 200, as a display member, fixedly disposed on the dashboard DB. Such light to be displayed is reflected by the combiner 200 and guided to an eye of a driver DR as an observer to display a virtual image (image to be displayed). Meanwhile, the driver DR can observe a real image, such as view, passing through the combiner 200, superimposed on the virtual image. The combiner 200 may be folded and stored in the dashboard. The image generation unit 100 and the combiner 200 constitute the head-up display device.

Figure 2:
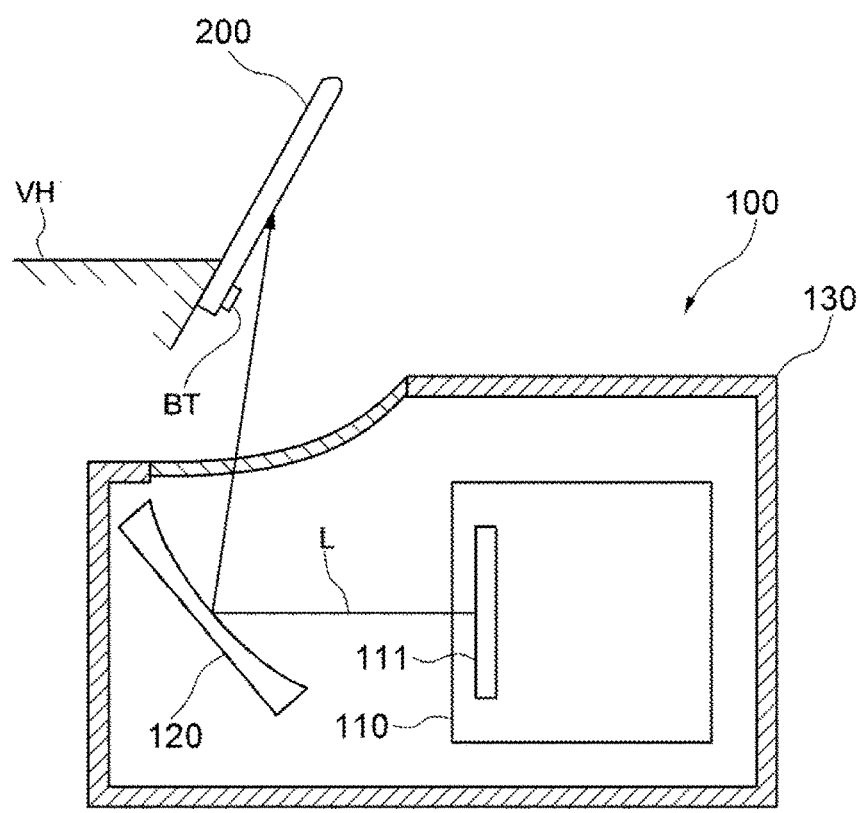
FIG. 2 is a diagram illustrating a configuration of an image generation unit 100.

FIG. 2 is a diagram illustrating a schematic configuration of the image generation unit 100. The image generation unit 100 mainly includes an image generation device 110 including a liquid crystal display panel 111, a concave mirror 120, and a housing 130. A configuration of the image generation device is described in detail, for example, in JP 2012-203176 A.

The liquid crystal display panel 111 is formed by applying polarizers on both of the front and back sides of a liquid crystal cell obtained by sealing a liquid crystal layer between a pair of translucent substrates on which transparent electrode films are formed. A light ray guided from a light source, not illustrated, in the image generation device 110 to a surface of the liquid crystal display panel 111 passes through the liquid crystal display panel 111 to be light L to be displayed, and the light L to be displayed is emitted to the concave mirror (or flat mirror) 120 constituting a projection optical system and is reflected to the combiner 200.

Figure 3C:
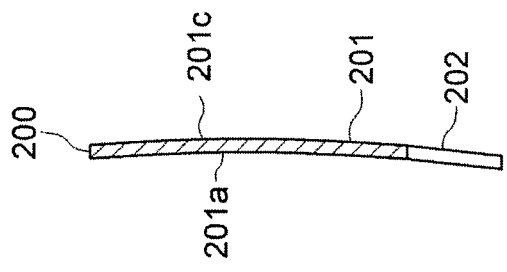
FIGS. 3A-3C are diagrams illustrating cross-sections of a combiner 200.
Figure 3B:
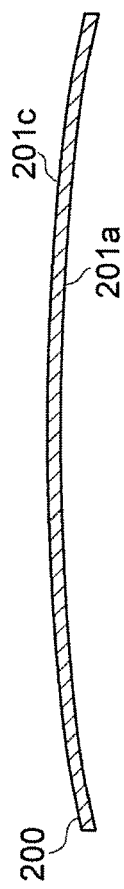
Figure 3A:
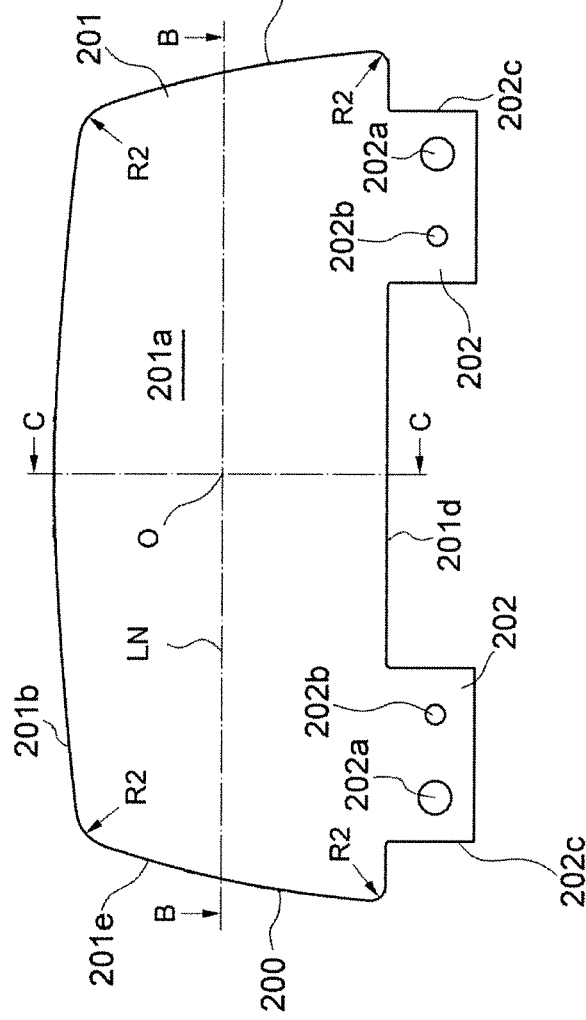

FIG. 3A is a diagram illustrating the front side of the combiner 200 (near the driver), FIG. 3B is a cross-sectional view taken along a line B-B of FIG. 3A and illustrating a configuration in a direction indicated by the arrows, and FIG. 3C is a cross-sectional view taken along a line C-C of FIG. 3A and illustrating a configuration in a direction indicated by the arrows. In FIGS. 3A-3C, the combiner 200 is formed into a plate shape having a thickness of 2 to 3 mm (preferably, 10 mm or less), and in the combiner 200, a projection unit 201 and a pair of mounted portions 202 are integrally formed.

The projection unit 201 can be made of a transparent resin, such as polycarbonate, cycloolefin polymer (COP), or acrylic, by using injection molding (using a pressure sensor in a mold). The projection unit 201 has a surface near the driver which is a projection surface (one optical surface) 201*a* for forming a virtual image. To form a virtual image, the projection surface 201*a* is a concave toric surface (may be an adjustable surface or spherical surface) having a curvature radius of not less than 100 mm, and the projection unit 201 has a back side (the other optical surface) 201*c* having a convex spherical surface or aspherical surface similar to the shape of the projection surface 201*a*. The projection unit 201 preferably has a constant thickness, but may be configured to have a thickness increasing or decreasing as separated from the center. In FIG. 3A, a point O positioned substantially at the center indicates a midpoint of the projection surface 201*a*. In one or more embodiments, a center position of an area of the projection surface 201*a* where an image is projected by the image generation unit 100 is defined as the midpoint of the projection surface 201*a*.

End surfaces of the projection unit 201 include an upper end surface 201*b*, side end surfaces 201*e*, and the like. Even if a conventional combiner is provided with an end surface roughened or finely textured, primary reflection or window reflection cannot be fully prevented only by providing the roughened or finely textured surface. Furthermore, in the combiner, although coating is often applied, for scratch prevention, to a surface to secure the hardness thereof, when the coating is applied to the surface which is roughened or finely textured, projections and recesses are buried upon coating, and light scattering effect may be lost. In contrast, masking of an end surface upon coating, or roughening or texturing of a surface in post processing is conceived, but the process is complicated and expensive. In contrast, as in one or more embodiments, when an end surface has a shape monotonically decreasing toward a back side, problems in the coating are eliminated and the cost is lowered. The shape of the upper end surface 201*b* will be described later. Each of the side end surface 201*e* may have a similar shape. The projection unit 201 may have a rounded chamfer at four corners. Note that the end surfaces may be a mirror surface.

The projection surface 201*a* is a spherical surface or aspherical surface having a curvature radius of not less than 100 mm, preferably, less than 800 mm but not less than 200 mm, and a known half-mirror film is preferably deposited thereon so that the projection surface 201*a* has a half mirror function to have a transmittance of not less than 70% and not more than 80%. Furthermore, the combiner 200 preferably has a surface over which a hard coat is formed to prevent scratches or the like. Note that when the hard coat is applied to the combiner 200, the hard coat preferably has a refractive index substantially equal to that of the combiner 200 so that the hard coat can be considered as a part of the combiner 200 in the following formulas (1) to (2).

The hard coat is applied by dip coating, spray coating, flow coating, spin coating, or the like. The hard coat is preferably applied to have a film thickness of 0.5 μm to 20 μm, preferably 1 μm to 10 μm. Then, on the projection surface 201*a*, a film containing $SiO_2$, SiO, $Al_2O_3$, $TiO_2$, or $La_2O_2$ is provided as an antireflection (AR) coat layer, and a film containing $SiO_2$, SiO, $Al_2O_3$, $TiO_2$, or $La_2O_2$ is provided as a half mirror layer. Note that, in the half mirror layer, a high refraction index layer and a low refraction index layer are alternately laminated. Furthermore, for securement of further preferable reflectance characteristics or from the viewpoint of securement of adhesion between the substrate and the hard coat, an intermediate refractive index layer may be appropriately inserted between some layers. Furthermore, ion-assisted processing, such as IAD, may be performed upon forming a hard coat layer. As a high refractive index material, an oxide or composite oxide including $TiO_2$, $La_2O_2$, $Ta_2O_5$, $ZrO_2$ or the like is preferably employed, as a low refractive index material, an oxide or composite oxide including $SiO_2$, $Al_2O_3$, or the like is preferably employed, and as an intermediate refractive index material, which is to be inserted, an oxide or composite oxide including $Al_2O_3$, $La_2O_2$, or the like is preferably employed. In addition, for the antifoulant coat layer, a fluorine-based material is used to constitute a film formed by vacuum deposition. Note that the antifoulant coat layer may be formed by dip coating or the like. In film forming, for the half mirror, the hard coat, the half mirror coat, and antifoulant coat are preferably formed in this order from the substrate side, and for the AR coat, the hard coat, the AR coat, and the antifoulant coat are preferably formed in this order.

The pair of mounted portions 202 extending to a lower end surface 201d of the projection unit 201 preferably has a rectangular extension surface having the same curvature radius as that of the projection surface 201a. Each of the mounted portions 202 is formed with two mounting holes 202a and 202b, and each of the two mounting holes 202a and 202b has an axis parallel to an optical axis. A bolt BT is inserted through any of the mounting holes 202a and 202b (see FIG. 2) to be threadedly engaged with part of the vehicle VH, and the combiner 200 can be mounted to the vehicle VH.

Figure 4:
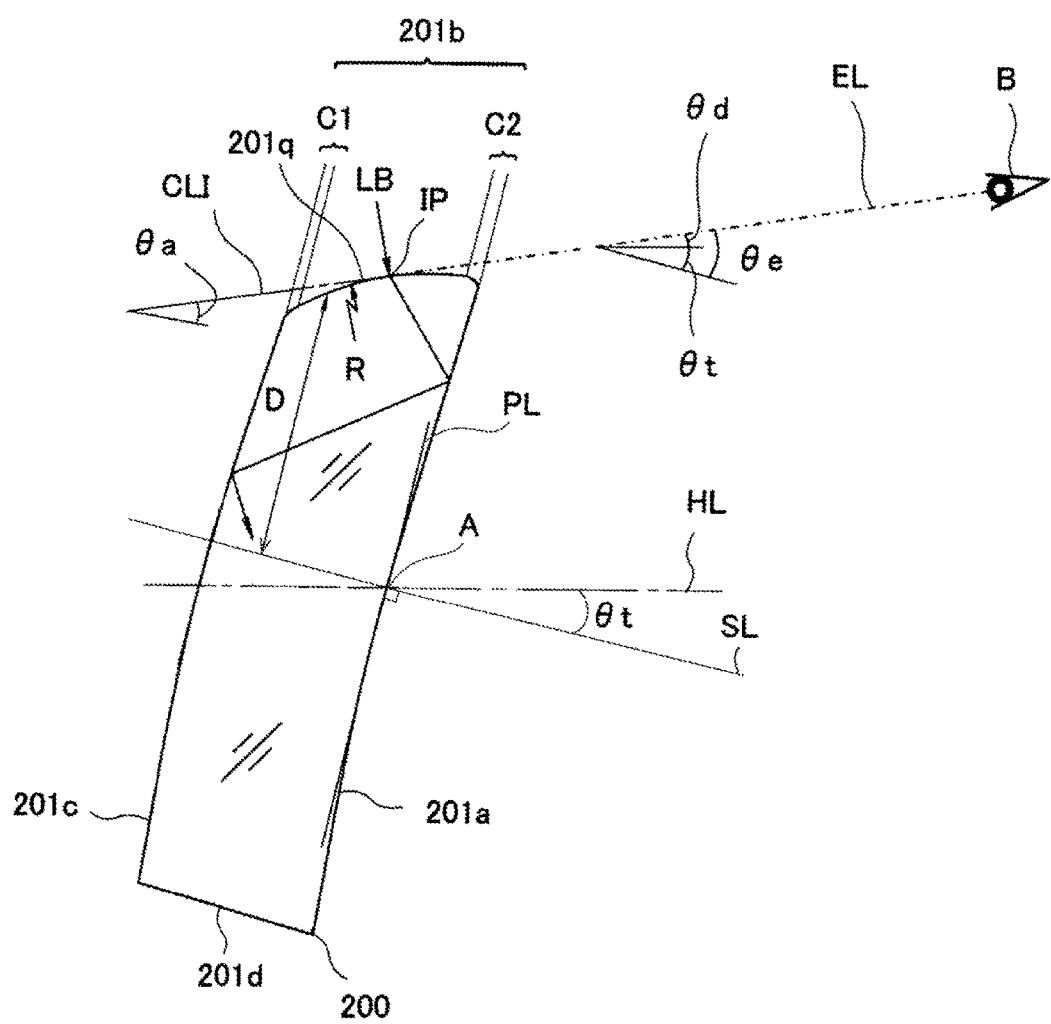
FIG. 4 is a schematic cross-sectional view of the combiner 200.

FIG. 4 is a schematic cross-sectional view of the combiner 200. More specifically, FIG. 4 is a cross-sectional view of the combiner 200 taken along a virtual plane passing through any point A, orthogonal to a tangent plane PL (when the projection surface 201a is a flat surface, projection surface 201a), and extending in a vertical direction, where the tangent plane PL is positioned at the point A on a line LN (here, a curve, see FIGS. 3A-3C) passing through the midpoint O of the projection surface 201a (see FIGS. 3A-3C) and extending along the projection surface 201a in a horizontal direction.

In FIG. 4, the upper end surface 201b (end surface on the upper side) as an end surface of the combiner 200 is constituted by a chamfered portion C1 making contact with the back side 201c, a chamfered portion C2 making contact with the projection surface 201a, and an end main surface 201q formed between the chamfered portions C1 and C2. Each of the chamfered portions C1 and C2 has an arcuate cross-section, and in order to minimize the influence of reflection of external light, it is preferable that the chamfered portion C1 has a radius of not more than 0.15 mm and the chamfered portion C2 has a radius of not more than 0.3 mm, in a thickness direction of the combiner 200. Furthermore, the end main surface 201q being an end surface area from which the chamfered portions are removed occupies at least 70% of the upper end surface 201b in the thickness direction of the combiner 200.

Although in some countries the chamfered portions C1 and C2 need to be provided from the viewpoint of ensuring safety, the chamfered portions C1 and C2 may bring about primary reflected light, secondary reflected light, or window reflection due to the chamfered portions. In particular, window reflection may be intensified due to the chamfered portion C2 positioned near the observer. From the viewpoint of further reduction of the window reflection, the chamfered portion C2 is preferably has an arithmetic average roughness Ra of not less than 3 µm to further prevent reflection (in particular, effective for window reflection in addition to primary reflection and secondary reflection). More preferably, not only the chamfered portion C2 but also an area of the end main surface 201q in the vicinity of the chamfered portion C2 (area occupying at least 10% of the end main surface) preferably has an arithmetic average roughness Ra of not less than 3 µm. Although the curvature, if any, of the end main surface and the shape of the chamfered portion C2 are likely to increase window reflection, since the area of the end main surface 201q in the vicinity of the chamfered portion C2 (area occupying at least 10% of the end main surface) has an arithmetic average roughness Ra of not less than 3 µm, light can be scattered, and the window reflection can be reduced. More preferably, the upper end surface 201b including the chamfered portion C1 and the end main surface 201q also has an arithmetic average roughness Ra of not less than 3 µm. Note that each of the side end surfaces 201e also preferably has an arithmetic average roughness Ra of not less than 3 µm. When the arithmetic average roughness Ra is not less than 3 µm, sufficient light scattering effect can be obtained, but the arithmetic average roughness Ra may be not less than 3.5 µm or not less than 4.0 µm. Furthermore, the upper limit of general roughness is not particularly limited, but considering ease of processing a mold, the arithmetic average roughness Ra is preferably not more than 50 µm. Here, the arithmetic average roughness Ra is measured using center line average roughness in accordance with JIS 0601-1976 (standards of arithmetic average roughness Ra). Note that when an end surface of the combiner 200 is not applied to coating or the like, the arithmetic average roughness of the end surface represents an arithmetic average roughness of the end surface itself, but when an end surface of the combiner 200 is applied to coating or the like, the arithmetic average roughness of the end surface represents an arithmetic average roughness of the end surface being coated. This is because even if an end surface of the combiner before coating has a roughness of not less than 3 µm, the light scattering effect cannot be obtained from the projections and recesses buried due to coating. For roughening of an end surface, the end surface may be roughened in post processing after molding the combiner, but it is preferable to roughen a mold itself by using sandblasting, texturing, or the like in advance, and transfer the roughened shape of the mold to roughen the end surface, from the viewpoint of reduction of the process steps.

In FIG. 4, when a line passing through the point A and orthogonal to the tangent plane PL is defined as a reference line SL, the end main surface 201q is formed to have a shape so that a distance D from the reference line SL to the end main surface 201q monotonically decreases from the projection surface 201a to the back side 201c. In an example of FIG. 4, the end main surface 201q has an outwardly convex shape, but may have a concave shape or a planar shape. In particular, from the viewpoint of reduction of primary reflected light or window reflection, the end main surface 201q preferably has a convex or a concave shape.

Here, when external light, such as sunlight, is incident on the end main surface 201q, the incident point on the end main surface 201q is defined as IP. An angle between a line EL connecting the center of the eye B of the driver DR with the incident point IP and a horizontal line is called a look down angle θd. Furthermore, an installation angle (inclination angle) of the combiner 200 is defined as θt (here, a crossing angle between the horizontal line HL and the reference line SL in FIG. 4). In general, the look down angle θd is 5° to 15°, and the installation angle θt is 10° to 20°. A sum of the look down angle θd and the installation angle θt is defined as a view angle θe. That is, the view angle θe is generally 15° to 35°.

At that time, when an external light beam LB, such as sunlight, is incident at the incident point IP on the end main surface 201q, the external light beam LB is partially reflected, but the rest of the external light beam LB enters the combiner 200 and guided in the combiner 200 while being totally internally reflected. According to one or more embodiments, in FIG. 4, since the distance from the reference line SL to the end main surface 201q monotonically decreases from the projection surface 201a to the back side 201c, the combiner can be readily molded, but when external light such as sunlight is incident thereon, reflected light directly from the end main surface 201q (primary reflected light) can be prevented from being incident on the eye B of the driver DR. Furthermore, since the end main surface 201$q$ has the outwardly convex shape, light can be scattered, and primary reflected light or window reflection can be further prevented. Even if the end main surface 201$q$ has a concave shape, similar effects can be obtained.

Furthermore, in FIG. 4, when an angle θa of a tangent line CLI drawn at the incident point IP with respect to the reference line SL is less than 90° but not less than 10° (when the end main surface 201$q$ is a flat surface, the inclination angle of the end main surface 201$q$ is employed), a primary reflected light ray of an external light beam, such as sunlight, incident on the end main surface 201$q$ can be prevented from being emitted toward the driver.

In contrast, according to the work of the present inventors, it was found that light entering the combiner 200 from the upper end surface and guided therein is returned to the end main surface 201$q$ and reflected from the end main surface 201$q$ to be emitted from the projection surface 201$a$, but when such light enters the eye B of the driver DR, the light bothers the driver DR. This is called secondary reflection. Therefore, in one or more embodiments, the following measures are taken.

Figure 5:
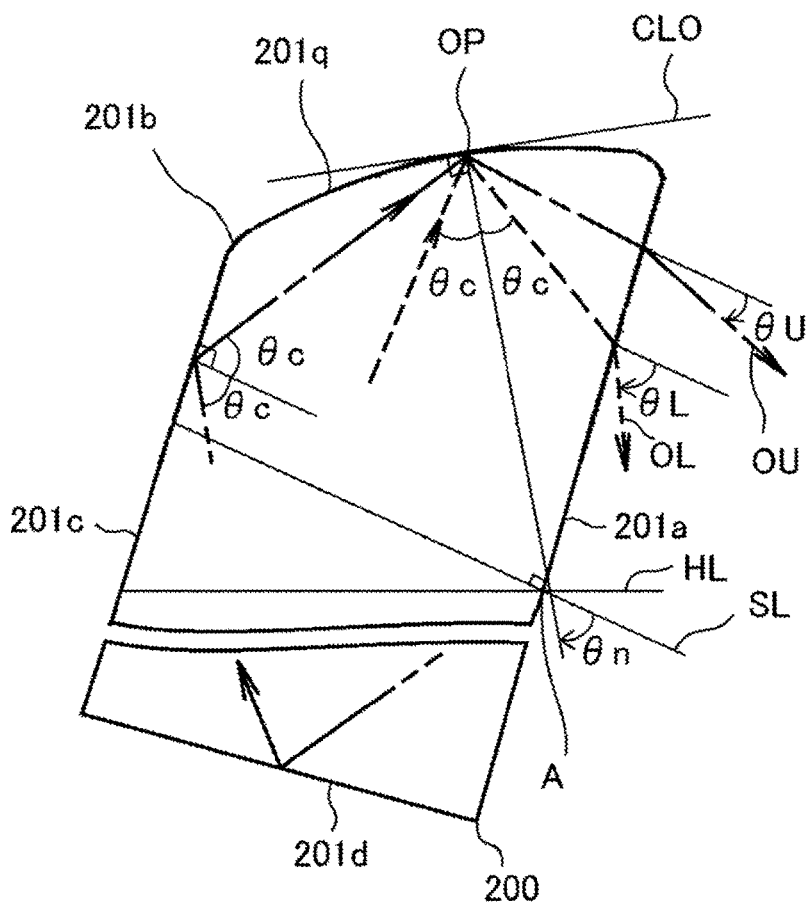
FIG. 5 is a partially enlarged cross-sectional view of the combiner 200.

In the following, an example of an optical path causing the secondary reflection will be described. Note that an example of the upper end surface is described here, but the same is applied to the side end surfaces. FIG. 5 is a partially enlarged cross-sectional view of the combiner 200. As illustrated in FIG. 4, when the external light beam LB is incident at the incident point IP on the end main surface 201$q$, the incident light is refracted according to a refractive index nd of the combiner 200. The refracted incident light is firstly directed to the projection surface 201$a$, is reflected from the projection surface 201$a$ to the back side 201$c$, and is reflected from the back side 201$c$ to the projection surface 201$a$. This process is repeated to guide the external light beam LB reflected in the combiner 200. Then, the light ray reaching the lower end surface 201$d$ of the combiner is reflected by the lower end surface 201$d$, and is guided toward the upper end surface 201$b$ again. After that, as illustrated in FIG. 5, the light ray reaching a destination OP on the upper end surface 201$b$ (within the range of the end main surface 201$q$, here) is reflected at or transmitted from the destination OP. Here, most of light rays causing the secondary reflection are totally internally reflected at the back side 201$c$, and reach the upper end surface 201$b$. When the incident angle of a light ray with respect to the back side 201$c$ is smaller than a critical angle θc satisfying a total reflection condition, most of such light rays are emitted outside through the back side 201$c$, and light guidance in the combiner 200 is not substantially performed. Therefore, a light ray reaching the destination OP on the upper end surface 201$b$ from the back side 201$c$ is substantially limited to a light ray (one-dot chain line) incident on the back side 201$c$ at an angle of not less than the critical angle θc. Furthermore, when an incident light ray has an incident angle smaller than the critical angle θc with respect to a tangent line CLO drawn at the destination OP, most of such incident light rays are emitted outside through the destination OP on the upper end surface 201$b$. Therefore, a light ray reflected at the destination OP on the upper end surface 201$b$ to the projection surface 201$a$ is substantially limited to a light ray (dashed line) incident on the tangent line CLO at an angle not less than the critical angle θc. That is, light emitted from the projection surface 201$a$ after being guided in the combiner 200 is substantially limited to a range defined by a light ray OU reflected from the back side 201$c$ at the critical angle θc, totally internally reflected from the upper end surface 201$b$, and emitted from the projection surface 201$a$, and an light ray OL totally internally reflected from the back side 201$c$, reflected from the upper end surface 201$b$ at the critical angle θc, and emitted from the projection surface 201$a$. When the projection surface 201$a$ and the back side 201$c$ are flat surfaces parallel to each other, an angle θU between the light ray OU and the reference line SL and an angle θL between the light ray OL and the reference line SL are geometrically expressed as θL=arcsin(nd×sin(−2×θn−θc)) and θU=arcsin(nd×sin(θn−θc)), respectively. As described above, to prevent light rays within this range from being incident on the eye B of the driver DR, the view angle θe (°) between the reference line SL and the intended line of sight of the driver DR in FIG. 4 preferably satisfies formula (1). Note that, relative to the reference line, a clockwise direction is negative and a counterclockwise is positive. Therefore, both of the secondary reflection and the window reflection can be effectively prevented.

$$\theta e \geq (\theta U+\theta L)/2=(\arcsin(nd\times\sin(\theta n-\theta c))+\arcsin(nd\times\sin(-2\times\theta n-\theta c)))/2 \quad (1)$$

wherein, θn: an angle (°) between the line NL normal to the destination OP of the end main surface 201$q$ and the reference line SL, nd: a refractive index of the combiner 200 at a wavelength of 555 nm, and θc: a critical angle (°)=arcsin (1/nd)

In order to reliably prevent the secondary reflected light, the following formula is preferably satisfied in particular.

$$\theta e \geq \arcsin(nd\times\sin(\theta n-\theta c)) \quad (2)$$

From the viewpoint of the reduction of reflected light based on internal reflection, formulas (1) to (2) are preferably satisfied in the whole area of at least one end surface, but from the viewpoint of reliable moldability of the combiner 200 and reliable safety for preventing the sharpness of a corner, margins for the chamfered portions C1 and C2 are preferably provided and formulas (1) to (2) are preferably satisfied in the whole end main surface 201$q$ other than the chamfered portions C1 and C2. Further preferably, formulas (1) to (2) are preferably satisfied also in the region of the chamfered portions C1 and C2 as much as possible. Note that a commercially available combiner is sampled and cut to obtain a cross-section thereof as illustrated in FIG. 4, and then a shape of an end surface of the combiner is derived to determine whether the end surface satisfies formulas (1) to (2).

In FIG. 4, the end main surface 201$q$ is preferably approximated by an arc having a curvature radius of not more than 20 mm. Thus, reflected light from the end main surface 201$q$ diffuses, preventing window reflection. Note that when the cross-section of the end main surface is approximated by an arc, a least squares method or the like can be employed.

Hereinafter, combiner evaluation performed by the present inventors will be described. The present inventors confirmed the effect of reducing secondary reflection by changing the shape of the upper end surface 201$b$ on the basis of the cross-section of FIG. 4. Firstly, optimization of the ratio of the end main surface 201$q$ to the upper end surface 201$b$ will be discussed. The present inventors evaluated the effect of reducing secondary reflected light of four kinds of combiners in which the respective end main surfaces 201$q$ have different thickness lengths being 60%, 65%, 75%, and 85% of the length of the upper end surface 201$b$. Results of the evaluation are shown in Table 1. According to Table 1, it was confirmed that when the ratio of the length of the end main surface 201$q$ to that of the upper end surface 201$b$ was increased from 60%, secondary reflected light is effectively reduced. According to such results of the evaluation, as shown in Table 2, it is found that when the ratio of the length of the end main surface 201q to that of the upper end surface 201b is not less than 70% and less than 80%, the effect of reducing secondary reflected light is further increased, in comparison with the ratio of the length of the end main surface 201q to that of the upper end surface 201b of less than 70%. Furthermore, it is found that when the ratio of the length of the end main surface 201q to that of the upper end surface 201b is not less than 80%, the effect of reducing secondary reflected light is further increased. Note that it is preferable that a chamfered portion is provided between the upper end surface 201b and an optical surface, and in that configuration, the ratio of the length of the end main surface 201q to that of the upper end surface 201b is preferably less than 90%.

TABLE 1

| Intensity of secondary reflected light (60% range is 100%) | θL | θU | θe |
|---|---|---|---|
| 60% | 100% | −68.3° | −14.6° | −41.45° |
| 65% | 92% | | | |
| 75% | 80% | | | |
| 85% | 71% | | | |

TABLE 2

| Range | Effect of reducing secondary reflected light |
|---|---|
| less than 70% | Δ (fair) |
| not less than 70%- less than 80% | ◯ (good) |
| not less than 80% | ⊙ (excellent) |

Next, the present inventors performed simulation by using a combiner having a flat end main surface 201q as a model with reference to FIG. 4. More specifically, in a combiner having the following specifications, the effect of reducing primary reflected light reaching an observer was evaluated. Results of the evaluation are displayed in Table 3. More specifically, it was confirmed that when an inclination angle θa of the tangent line CLI to the end main surface 201q with respect to the reference line SL is increased from 0°, primary reflected light can be reduced. According to such results of the evaluation, as shown in Table 4, it is found that when the inclination angle θa of the tangent line CLI to the end main surface 201q with respect to the reference line SL is not less than 10° and less than 15°, primary reflected light is further effectively reduced, in comparison with the inclination angle θa of the tangent line CLI to the end main surface 201q with respect to the reference line SL of not less than 0° and less than 10°. Furthermore, it is found that when the inclination angle θa of the tangent line CLI with respect to the reference line SL is not less than 15°, the effect of reducing primary reflected light is further increased.

(Combiner Specification)
End main surface 201q: flat surface
Inclination angle θa of the tangent line CLI to the end main surface 201q with respect to the reference line SL: [0°], [13°], and [16°]
Thickness of the combiner: 3 mm
Radius of the chamfered portion C1: 0.15 mm
Radius of the chamfered portion C2: 0.3 mm
Refractive index nd of the combiner: 1.585
Installation angle θt of the combiner: 10°
Look down angle θd: 5°
View angle θe: 15°
(θU+θL)/2: −41.45° (<θe)

TABLE 3

| Tangent angle θa to reference line [°] | Intensity of primary reflected light (θa = 0° is 100%) |
|---|---|
| 0 | 100% |
| 13 | 90% |
| 16 | 30% |

TABLE 4

| Tangent angle θa to reference line [°] | Effect of reducing primary reflected light |
|---|---|
| 0-10 | Δ (fair) |
| 10-15 | ◯ (good) |
| not less than 15 | ⊙ (excellent) |

Next, the present inventors performed simulation by using a combiner having a curved end main surface 201q as a model with reference to FIG. 4. More specifically, in a combiner having the following specifications, the effect of reducing window reflection was evaluated. Results of the evaluation are displayed in Table 5. More specifically, it was confirmed that when a curvature radius R of the end main surface 201q is reduced from 25 mm, window reflection is effectively reduced. According to such results of the evaluation, as shown in Table 6, it is found that when the curvature radius R of the end main surface 201q is not less than 10 mm and less than 50 mm, window reflection is further effectively reduced, in comparison with the curvature radius R of the end main surface 201q of not less than 50 mm. Furthermore, it is found that when the curvature radius R of the end main surface 201q is less than 10 mm, the effect of reducing window reflected light is further increased.

(Combiner Specification)
Curvature radius R of the end main surface 201q: [5.5 mm], [12 mm], and [25 mm]
Thickness of the combiner: 3 mm
Radius of the chamfered portion C1: 0.15 mm
Radius of the chamfered portion C2: 0.3 mm
Refractive index nd of the combiner: 1.585
Installation angle θt of the combiner: 10°
Look down angle θd: 5°
View angle θe: 15°

TABLE 5

| R [mm] | Intensity of light reflected to windshield (R = ∞ is 100%) |
|---|---|
| 5.5 | 79% |
| 12 | 98% |
| 25 | 99% |

TABLE 6

| R [mm] | Effect of reducing light reflected to windshield |
|---|---|
| −10 | ⊙ (excellent) |
| 10-20 | ◯ (good) |
| not less than 20 | Δ (fair) |

Figure 6:
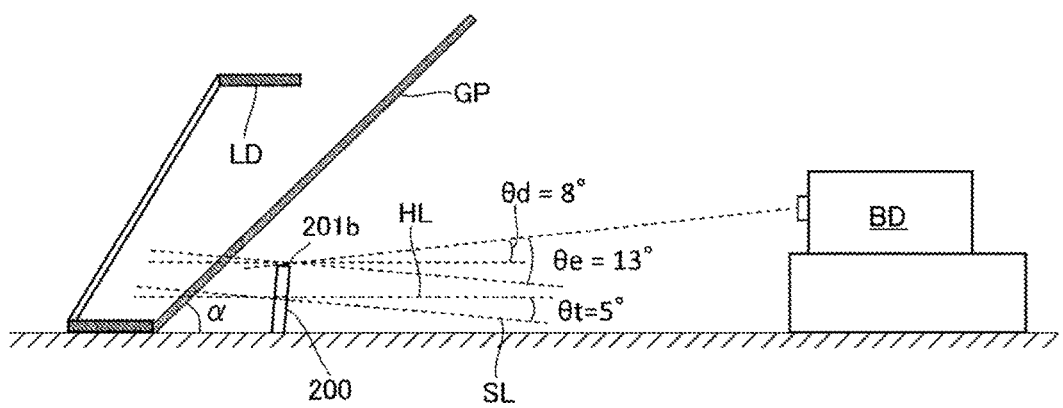
FIG. 6 is a diagram illustrating the effect of reducing the light intensity of window reflection in the combiner.

Furthermore, the present inventors actually formed, by injection molding, combiners having the following specifications, one of which is formed by a mold roughened by texturing to have an upper end surface 201b having an arithmetic average roughness of 3.5 μm as a whole, and another one of which is formed by a mold not textured (an arithmetic average roughness of the whole upper end surface 201b after molding of 0.1 μm: no roughened shape), and combiners having an end main surface 201q having a curvature radius of ∞ (flat surface substantially parallel to a horizontal direction). As illustrated in FIG. 6 being a schematic diagram, the light intensity of window reflection was measured, arranging the combiners vertically under an LED light source LD, arranging a glass plate GP between the LED light source LD and a combiner 200 at a predetermined angle, for example, to have an angle α=45° relative to a vertical direction, positioning the upper end surface 201b of the combiner to face the glass plate GP, arranging a luminance meter BD at a position corresponding to an eye of a driver (slightly above in a horizontal direction a position where window reflection is generated). Results of the evaluation are shown in Table 7. According to the results in Table 7, it is found that when the curvature radius R of the end main surface is 5.5 mm, reflection light intensity can be reduced to approximately half, in comparison with the upper end surface being a flat surface. Furthermore, it is found that when the curvature radius R of the end main surface is 5.5 mm, reflection light intensity can be reduced to the same extent as in the case of the upper end surface 201b roughened. That is, it was found that when the curvature radius R of the end main surface is 5.5 mm, reflection light intensity has the same amount as that of the end surface roughened, and the end surface has a shape to which hard coating or the like can be applied. Furthermore, it was found that when the curvature radius R of the end main surface is 5.5 mm and the upper end surface 201b is roughened, the light intensity of window reflection can be further reduced to approximately ⅓.

(Combiner Specification)
Curvature radius R of the end main surface 201q: [5.5 mm]
  Thickness of the combiner: 3 mm
  Radius of the chamfered portion C1: 0.15 mm
  Radius of the chamfered portion C2: 0.3 mm
  Refractive index nd of the combiner: 1.585
  Installation angle θt of combiner: 5°
  Look down angle θd: 8°
  View angle θe: 13°
  Material: polycarbonate

TABLE 7

| Curvature radius R of end main surface [mm] | Roughened shape | Intensity of light reflected from windshield (R = ∞ without roughened shape is 100%) |
| --- | --- | --- |
| ∞ | without (arithmetic mean roughness 0.1 μm) | 100% |
| ∞ | with (arithmetic mean roughness 3.5 μm) | 52.4% |
| 5.5 | without (arithmetic mean roughness 0.1 μm) | 57.1% |
| 5.5 | with (arithmetic mean roughness 3.5 μm) | 19.0% |

It is clear for a person skilled in the art from the embodiments, examples, or technical concepts described in the present specification that the present invention should not be limited to the embodiments and examples described in the present specification, and includes other embodiments, examples, and modifications. For example, the head-up display device according to the present invention can be used for, for example, an airplane or a heavy machine, in addition to an automobile.

REFERENCE SIGNS LIST

100 IMAGE GENERATION UNIT
110 IMAGE GENERATION DEVICE
111 LIQUID CRYSTAL DISPLAY PANEL
120 CONCAVE MIRROR
130 HOUSING
200 COMBINER (DISPLAY MEMBER)
201 PROJECTION UNIT
201a PROJECTION SURFACE (OPTICAL SURFACE)
201b UPPER END SURFACE
201c BACK SIDE (OPTICAL SURFACE)
201d LOWER END SURFACE
201e SIDE END SURFACE
201q END MAIN SURFACE
C1, C2 CHAMFERED PORTION
DB DASHBOARD
DR DRIVER (OBSERVER)
SL REFERENCE LINE
VH VEHICLE
WS WINDSHIELD

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:
1. A head-up display device comprising:
an image generator that emits light; and
a display member comprising:
  a projection surface onto which the light is projected, wherein
  when the light is emitted to the projection surface, the light is reflected from the projection surface to display a real image passing through the display member and a virtual image; and
a plate material comprising:
  a pair of optical surfaces, one positioned nearer to an observer side than the other, and either of which can serve as the projection surface;
  an end surface connecting peripheries of the pair of optical surfaces; and
  an end main surface formed at a predetermined distance from the end surface to a reference line passing through a reference point on the projection plane and being orthogonal to a tangent plane at the reference point, monotonically decreasing from the optical surface positioned nearer to the observing side to the other optical surface, in a cross-section of the display member taken along a virtual plane orthogonal to the tangent plane, passing through the reference point, and extending in a vertical direction, wherein the tangent plane is positioned at the reference point on a line passing through a midpoint of the projection surface and extending in a horizontal direction along the projection surface, the end main surface occupies at least 70% of the end surface in a thickness direction of the display member, and the following formula is satisfied in the cross-section:

$$\theta e \geq (\arcsin(nd \times \sin(\theta n - \theta c)) + \arcsin(nd \times \sin(-2 \times \theta n - \theta c)))/2 \quad (1)$$

wherein,

θe: an angle (°) between the reference line and an intended line of sight of an observer of the head-up display device, θn: an angle (°) between a line normal to any point on the end main surface and the reference line, nd: a refractive index of the display member at a wavelength 555 nm, and θc: critical angle (°)=arcsin (1/nd).

2. The head-up display device according to claim 1, wherein
when a tangent line is drawn at any point on the end main surface in the cross-section, an angle of the tangent line with respect to the reference line is not less than 10°.

3. The head-up display device according to claim 2, wherein
when the end main surface is approximated by an arc in the cross-section, the arc has a curvature radius of not more than 20 mm.

4. The head-up display device according to claim 2, wherein
the end main surface is positioned at an upper end surface when the display member is installed.

5. The head-up display device according to claim 2, wherein
the end surface comprises the end main surface and a chamfer in the cross-section.

6. The head-up display device according to claim 2, wherein
the display member is made of resin, and hard coating is applied to the optical surface.

7. The head-up display device according to claim 2, wherein
the optical surface positioned nearer to the observing side is a concave surface having a half-mirror function, and
the other optical surface is a convex surface.

8. The head-up display device according to claim 2, wherein
at least part of the end surface has an arithmetic average roughness of not less than 3 μm.

9. The head-up display device according to claim 1, wherein
the following formula is satisfied in the cross-section:

$$\theta e \geq \arcsin(nd \times \sin(\theta n - \theta c)) \quad (2).$$

10. The head-up display device according to claim 1, wherein
when the end main surface is approximated by an arc in the cross-section, the arc has a curvature radius of not more than 20 mm.

11. The head-up display device according to claim 1, wherein
the end main surface is positioned at an upper end surface when the display member is installed.

12. The head-up display device according to claim 1, wherein
the display member is made of resin, and hard coating is applied to the optical surface.

13. The head-up display device according to claim 1, wherein
at least part of the end surface has an arithmetic average roughness of not less than 3 μm.

14. The head-up display device according to claim 1, wherein
the head-up display device is mounted to an automobile and is installed at a position where the head-up display device can be observed by a driver of the automobile.

15. The head-up display device according to claim 14, wherein
the head-up display device is installed on a dashboard of the automobile.

16. A head-up display device comprising:
an image generator that emits light; and
a display member comprising:
  a projection surface onto which the light is projected, wherein
  when the light is emitted to the projection surface, the light is reflected from the projection surface to display a real image passing through the display member and a virtual image; and
  a plate material comprising:
    a pair of optical surfaces, one positioned nearer to an observer side than the other, and either of which can serve as the projection surface;
    an end surface connecting peripheries of the pair of optical surfaces; and
    an end main surface formed at a predetermined distance from the end surface to a reference line passing through a reference point on the projection plane and being orthogonal to a tangent plane at the reference point, monotonically decreasing from the optical surface positioned nearer to the observing side to the other optical surface, in a cross-section of the display member taken along a virtual plane orthogonal to the tangent plane, passing through the reference point, and extending in a vertical direction, wherein
    the tangent plane is positioned at the reference point on a line passing through a midpoint of the projection surface and extending in a horizontal direction along the projection surface,
    the end main surface occupies at least 70% of the end surface in a thickness direction of the display member, and
    the end surface comprises the end main surface and a chamfer in the cross-section.

17. A head-up display device comprising:
an image generator that emits light; and
a display member comprising:
  a projection surface onto which the light is projected, wherein
  when the light is emitted to the projection surface, the light is reflected from the projection surface to display a real image passing through the display member and a virtual image; and
  a plate material comprising:
    a pair of optical surfaces, one positioned nearer to an observer side than the other, and either of which can serve as the projection surface;

an end surface connecting peripheries of the pair of optical surfaces; and an end main surface formed at a predetermined distance from the end surface to a reference line passing through a reference point on the projection plane and being orthogonal to a tangent plane at the reference point, monotonically decreasing from the optical surface positioned nearer to the observing side to the other optical surface, in a cross-section of the display member taken along a virtual plane orthogonal to the tangent plane, passing through the reference point, and extending in a vertical direction, wherein the tangent plane is positioned at the reference point on a line passing through a midpoint of the projection surface and extending in a horizontal direction along the projection surface, the end main surface occupies at least 70% of the end surface in a thickness direction of the display member, and the optical surface positioned nearer to the observing side is a concave surface having a half-mirror function, and the other optical surface is a convex surface.

* * * * *